(12) United States Patent
Xia et al.

(10) Patent No.: US 12,202,473 B2
(45) Date of Patent: Jan. 21, 2025

(54) OBSTACLE TRACKING METHOD, STORAGE MEDIUM AND UNMANNED DRIVING DEVICE

(71) Applicant: Beijing Sankuai Online Technology Co., Ltd., Beijing (CN)

(72) Inventors: Huaxia Xia, Beijing (CN); Shanbo Cai, Beijing (CN)

(73) Assignee: Beijing Sankuai Online Technology Co., Ltd., Beijing (CN)

( * ) Notice: Subject to any disclaimer, the term of this patent is extended or adjusted under 35 U.S.C. 154(b) by 538 days.

(21) Appl. No.: 17/669,355

(22) Filed: Feb. 11, 2022

(65) Prior Publication Data

US 2022/0314980 A1     Oct. 6, 2022

(30) Foreign Application Priority Data

Apr. 6, 2021   (CN) .......................... 202110364576.6

(51) Int. Cl.
*B60W 30/095*   (2012.01)
*B60W 40/04*   (2006.01)

(52) U.S. Cl.
CPC ........ *B60W 30/0956* (2013.01); *B60W 40/04* (2013.01); *B60W 2420/408* (2024.01);
(Continued)

(58) Field of Classification Search
CPC ............. B60W 30/0956; B60W 40/04; B60W 2420/408; B60W 2554/4041;
(Continued)

(56) References Cited

U.S. PATENT DOCUMENTS

2019/0080183 A1     3/2019   Li et al.

FOREIGN PATENT DOCUMENTS

| CN | 104318206 A | 1/2015 |
|---|---|---|
| CN | 109509210 A | 3/2019 |

(Continued)

OTHER PUBLICATIONS

State Intellectual Property Office of the People's Republic of China, Office Action and Search Report Issued in Application No. 2021103645766, May 14, 2021, 10 pages. (Submitted with Machine/Partial Translation).

(Continued)

*Primary Examiner* — Nimesh Patel
(74) *Attorney, Agent, or Firm* — Kilpatrick Townsend & Stockton LLP (57) ABSTRACT

An obstacle tracking method and apparatus, a storage medium and an unmanned driving device are provided. An obstacle aggregation region in a first point cloud may be determined according to position information of each obstacle in the first point cloud acquired by the unmanned driving device. Then, an aggregated obstacle and a non-aggregated obstacle in the second point cloud acquired by the unmanned driving device are determined according to the obstacle aggregation region. In addition, a matching result of each aggregated obstacle is respectively determined based on a group matching rule, and a matching result of each non-aggregated obstacle is respectively determined based on a non-group matching rule. Finally, an obstacle tracking result is determined according to the matching result of each obstacle in the second point cloud.

20 Claims, 3 Drawing Sheets

(52) U.S. Cl.
CPC ............... *B60W 2554/4041* (2020.02); *G06T 2207/30261* (2013.01)

(58) Field of Classification Search
CPC ......... B60W 2554/80; B60W 2556/45; B60W 60/0027; B60W 2420/403; B60W 2050/0005; B60W 2556/00; B60W 2556/35; B60W 40/10; B60W 50/00; B60W 60/00; B60W 60/001; B60W 30/06; B60W 40/02; B60W 10/06; B60W 10/08; B60W 20/00; B60W 20/10; B60W 20/11; B60W 20/15; B60W 2510/0638; B60W 2510/104; B60W 2510/1045; B60W 2510/105; B60W 2520/10; B60W 2552/15; B60W 2710/0666; G06T 7/248; G06T 2207/10028; G06T 2207/30261; G06T 2207/10044; G06T 2207/30252; G06T 7/73; G06T 7/246; G06T 2207/20081; G06T 2207/20084; G06T 2207/10016; G06T 5/70; G06T 7/70; G06T 7/80; G06T 2207/30244; G06T 7/0004; G06T 7/20; G06T 7/13; G06T 7/11; G06T 7/85; G06T 7/33; G06T 2200/04; G06T 2207/10012; G06T 2207/20036; G06T 2207/30248; G06T 2207/30196; G06T 7/55; G06T 7/77; G06T 17/00; G06T 2207/20104; G06T 5/50; G06T 7/344; G06T 7/35; G06T 7/38; G06T 2207/30242; G06T 7/174; G06T 7/002; G06T 2207/10024; G06T 2207/20212; G06T 2207/30168; G06T 2207/20221; G06T 1/00; G06T 7/50; G06T 11/00; G06T 2210/04; G06T 19/00; G06T 7/593; G06T 5/20; G06T 7/00; G06T 7/75; G06T 15/00; G06T 19/20; G06T 2207/20021; G06T 2207/30256; G06T 7/136; G06T 7/215; G06T 15/205; G06T 2207/10004; G06T 2207/10048; G06T 7/97; G01S 17/931; G01S 17/86; G01S 17/89; G01S 7/497; G01S 7/4808; G01S 17/93; G01S 17/58; G01S 17/66; G01S 7/417; G06V 10/82; G06V 2201/07; G06V 20/58; G06V 20/56; G06V 10/25; G06V 10/806; G06V 20/64; G06V 10/762; G06V 10/40; G06V 10/44; G06V 10/74; G06V 10/764; G06V 20/582; G06V 20/588; G06V 10/757; G06V 10/809; G06V 10/255; G06V 20/20; G06V 20/52; G06V 10/761; G06V 20/698; G06V 2201/10; G06V 40/172; G06V 10/765; G06V 20/80; G06V 10/16; G06V 10/898; G06V 10/88; G06V 10/87; G06V 20/647; G06V 2201/12; G06V 40/19; G06N 3/045; G06N 3/08; G06N 3/0464; G06N 3/044; G06N 3/0455; G05D 1/0257; G05D 1/0088; G05D 1/027; G05D 1/0268; G05D 1/0223; G05D 1/0214; G06F 18/23; G06F 16/29; G06F 18/24; G06F 18/214; G06F 18/253; G06F 18/22; G06F 18/487; G06F 16/489; B60R 21/01516; B60R 21/0152; B60R 21/01532; B60R 21/01534; B60R 21/01536; B60R 21/01546; B60R 21/01548; B60R 21/01554; B60L 15/20; B60L 2240/441; B60L 2240/486; B60L 2240/642; B60L 2260/54

See application file for complete search history.

(56) References Cited

FOREIGN PATENT DOCUMENTS

| | | |
|---|---|---|
| CN | 110458055 A | 11/2019 |
| CN | 112347999 A | 2/2021 |
| CN | 112348897 A | 2/2021 |
| CN | 112393735 A | 2/2021 |

OTHER PUBLICATIONS

Fel Yang et.al "Real-time dynamic obstacle detection and tracking using 3D Lidar", Sep. 30, 2012, 7 pages.

OBSTACLE TRACKING METHOD, STORAGE MEDIUM AND UNMANNED DRIVING DEVICE

CROSS REFERENCE TO RELATED APPLICATIONS

This application claims priority to Chinese Patent Application No. 202110364576.6, filed on Apr. 6, 2021, which is incorporated herein by reference in its entirety.

TECHNICAL FIELD

This application relates to the field of unmanned driving technologies and in particular to an obstacle tracking method and apparatus, a storage medium and an unmanned driving device.

BACKGROUND

Currently, during driving, an unmanned driving device is to perform path planning in real time according to a position of the unmanned driving device and a position of each surrounding obstacle, to perform obstacle avoidance driving.

However, the surrounding obstacles include static obstacles and dynamic obstacles, the dynamic obstacles continuously move, and positions change in real time. Therefore, each dynamic obstacle further needs to be tracked, to predict a moving track of each dynamic obstacle according to a tracking result, and to further plan a driving path of the unmanned driving device.

When the obstacle is tracked, obstacle detection may be first performed for every two consecutive frames of laser point clouds acquired by the unmanned driving device, to determine each obstacle included in the two consecutive frames of laser point clouds. Then, according to obstacle information of each obstacle in the two consecutive frames of laser point clouds, for example, information such as a position of a central point of the obstacle and a size of the obstacle, a matching between every two obstacles in the two frames of laser point clouds is performed, to determine a matching result. Finally, an obstacle tracking result is determined according to the matching result.

However, when there are relatively dense dynamic obstacles around the unmanned driving device, such as crowds and traffic flow, because distances between the dynamic obstacles are relatively close, matching errors are prone to occur during obstacle matching, resulting in an inaccurate obstacle tracking result, and further affecting subsequent path planning.

SUMMARY

Embodiments in accordance with this disclosure provide an obstacle tracking method and apparatus, a storage medium and an unmanned driving device.

An obstacle tracking method is provided. The method includes:
  obtaining two frames of laser point clouds acquired by an unmanned driving device as a first point cloud and a second point cloud;
  determining an obstacle aggregation region in the first point cloud according to position information of each obstacle in the first point cloud;
  determining, according to a position of the obstacle aggregation region, at least one obstacle in the second point cloud that falls within the obstacle aggregation region as at least one aggregated obstacle, and at least one another obstacle in the second point cloud except the at least one aggregated obstacle as at least one non-aggregated obstacle;
  for each of the at least one aggregated obstacle, respectively determining matching parameter values between the aggregated obstacle and each obstacle in the first point cloud by using a group matching rule, and determining a matching result of the aggregated obstacle according to the matching parameter values between the aggregated obstacle and each obstacle in the first point cloud;
  for each non-aggregated obstacle in the at least one non-aggregated obstacle, respectively determining matching parameter values between the non-aggregated obstacle and each obstacle in the first point cloud by using a non-group matching rule, and determining a matching result of the non-aggregated obstacle according to the matching parameter values between the non-aggregated obstacle and each obstacle in the first point cloud, where a constraint condition of the group matching rule is stronger than a constraint condition of the non-group matching rule; and
  determining an obstacle tracking result according to a matching result of each of the at least one aggregated obstacle and a matching result of each non-aggregated obstacle in the at least one non-aggregated obstacle.

This disclosure provides an obstacle tracking apparatus, including:
  an obtaining module, configured to obtain two frames of laser point clouds acquired by an unmanned driving device as a first point cloud and a second point cloud respectively;
  a determining module, configured to determine an obstacle aggregation region in the first point cloud according to position information of each obstacle in the first point cloud;
  a classification module, configured to determine, according to a position of the obstacle aggregation region, at least one obstacle in the second point cloud that falls within the obstacle aggregation region as at least one aggregated obstacle, and at least one another obstacle in the second point cloud except the at least one aggregated obstacle as at least one non-aggregated obstacle;
  a first matching module, configured to, for each of the at least one aggregated obstacle, respectively determine matching parameter values between the aggregated obstacle and each obstacle in the first point cloud by using a group matching rule, and determine a matching result of the aggregated obstacle according to the matching parameter values between the aggregated obstacle and each obstacle in the first point cloud;
  a second matching module, configured to, for each non-aggregated obstacle in the at least one non-aggregated obstacle, respectively determine matching parameter values between the non-aggregated obstacle and each obstacle in the first point cloud by using a non-group matching rule, and determine a matching result of the non-aggregated obstacle according to the matching parameter values between the non-aggregated obstacle and each obstacle in the first point cloud, where a constraint condition of the group matching rule is stronger than a constraint condition of the non-group matching rule; and a tracking module, configured to determine an obstacle tracking result according to a matching result of each of the at least one aggregated obstacle and a matching result of each non-aggregated obstacle in the at least one non-aggregated obstacle.

This disclosure provides a computer-readable storage medium, storing a computer program, the computer program, when executed by a processor, implementing the foregoing obstacle tracking method.

This disclosure provides an unmanned driving device, including a memory, a processor, and a computer program stored in the memory and executable on the processor, the processor, when executing the program, implementing the foregoing obstacle tracking method.

The at least one technical solution adopted in the embodiments in accordance with this disclosure can achieve the following beneficial effects:

In accordance with this disclosure, an obstacle aggregation region in the first point cloud may be determined according to position information of each obstacle in the first point cloud acquired by the unmanned driving device. Then, an aggregated obstacle and a non-aggregated obstacle in the second point cloud acquired by the unmanned driving device are determined according to the obstacle aggregation region. In addition, a matching result of each aggregated obstacle is respectively determined based on a group matching rule, and a matching result of each non-aggregated obstacle is respectively determined based on a non-group matching rule. Finally, an obstacle tracking result is determined according to the matching result of each obstacle in the second point cloud. Based on different matching rules, the aggregated obstacle and the non-aggregated obstacle are respectively matched, which improves the matching accuracy of the aggregated obstacle, so that the obstacle tracking result is more accurate.

BRIEF DESCRIPTION OF DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings.

DETAILED DESCRIPTION

To state the objectives, technical solutions, and advantages of this disclosure, the technical solutions of this application will be clearly and completely described below with reference to specific embodiments in accordance with this disclosure and corresponding accompanying drawings. Apparently, the described embodiments are only some embodiments rather than all the embodiments, and thus are not intend to limit this disclosure. All other embodiments obtained by a person of ordinary skill in the art based on the embodiments in accordance with this disclosure without creative efforts shall fall within the protection scope of this application.

Currently, during obstacle tracking in the field of unmanned driving, a matching between every two obstacles in two consecutive frames of laser point clouds acquired by an unmanned driving device is generally performed, and an obstacle tracking result is determined according to a matching result.

However, when there are relatively dense obstacle groups such as people flow and traffic flow in a surrounding environment, because laser points in a laser point cloud corresponding to the obstacle group in adjacent frames are densely distributed, it is inevitable to make errors during obstacle matching. In addition, it is also difficult to accurately distinguish each obstacle from the laser points that are densely distributed, and situations such as under-segmentation may occur. For example, if two obstacles are detected as one obstacle, obstacle matching errors are also caused during subsequent obstacle matching, and an inaccurate obstacle tracking result is further caused, affecting subsequent path planning of the unmanned driving device.

Figure 1:
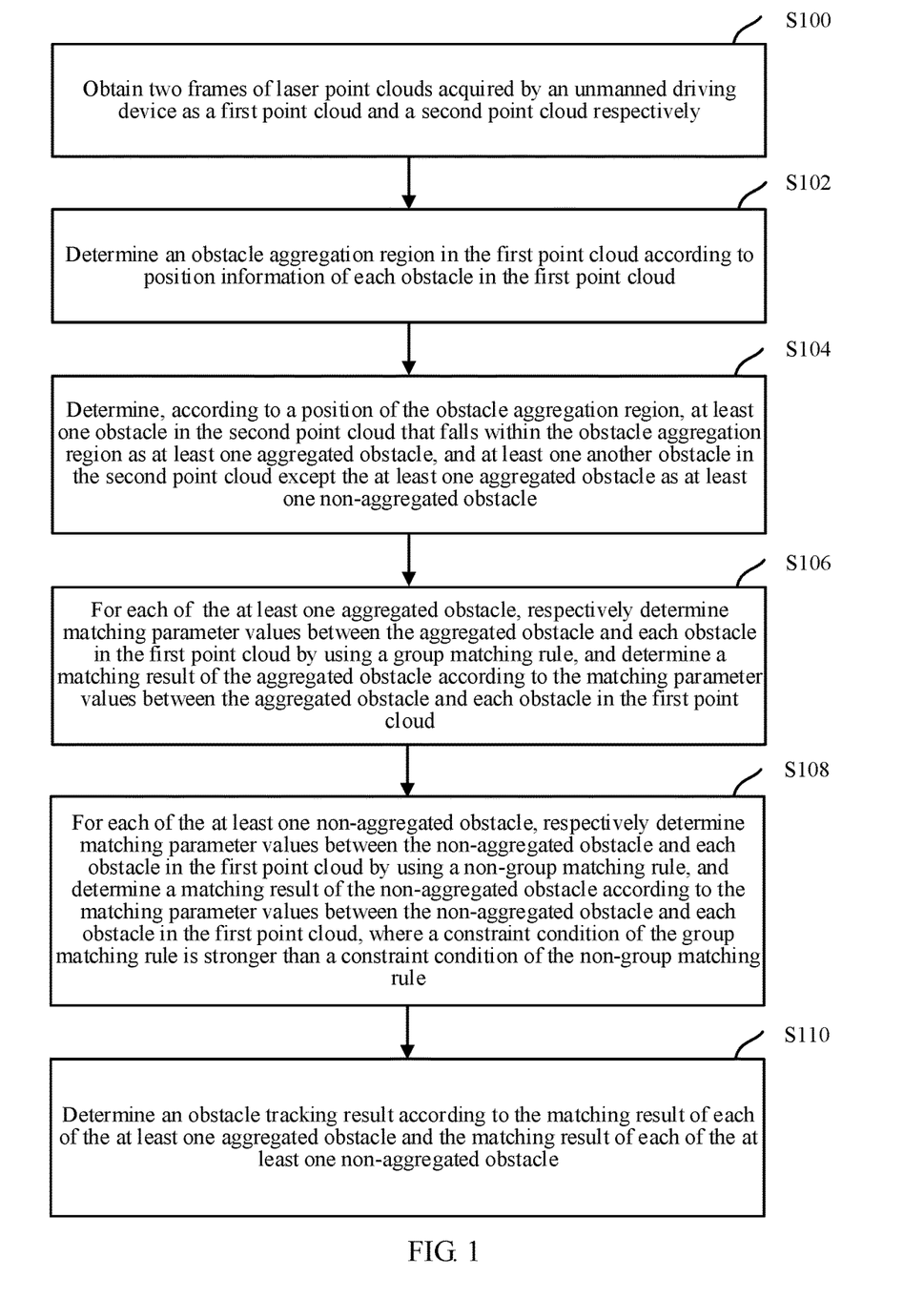
FIG. 1 is a schematic flowchart of an obstacle tracking method according to an embodiment of this disclosure.

Based on the foregoing existing technical problems, this disclosure provides an obstacle tracking method, as shown in FIG. 1.

FIG. 1 is a schematic flowchart of an obstacle tracking method according to an embodiment of this disclosure, which may specifically include the following steps:

S100: Obtain two frames of laser point clouds acquired by an unmanned driving device as a first point cloud and a second point cloud respectively.

In this disclosure, to track a change of each surrounding obstacle in real time, an obstacle matching may be performed on every two consecutive frames of laser point clouds acquired by the unmanned driving device in a surrounding environment, a position change of a same obstacle in every two consecutive frames of the laser point clouds is tracked, to continuously track the same obstacle. Certainly, to reduce a calculation amount of obstacle matching, an obstacle matching may alternatively be performed on two frames of laser point clouds at intervals acquired by the unmanned driving device. For example, an obstacle matching is performed on an acquired first frame of laser point cloud and an acquired third frame of laser point cloud. This is not limited in this disclosure, and may be set as desired. The obstacle matching in examples herein is intended to determine whether obstacles are a same obstacle.

The obstacle tracking method may be performed by the unmanned driving device, or may be performed by a server that controls the driving of the unmanned driving device. The server may be a single server, or may be a system including a plurality of servers such as a distributed server cluster, or may be a physical server device, or may be a cloud server. This is not limited in this disclosure, and may be specifically set as required.

If the server that controls the driving of the unmanned driving device performs the obstacle tracking method, the unmanned driving device may send acquired laser point clouds in a surrounding environment to the server. The server performs obstacle tracking by using the method provided in this disclosure, predicts a future moving track of each obstacle according to obstacle information of each tracked obstacle, to plan a driving path of the unmanned driving device, and sends the planned driving path to the unmanned driving device, so that the unmanned driving device drives according to the planned path. For ease of description, an example in which the unmanned driving device serving as an execution body performs the obstacle tracking method in this disclosure is used for description subsequently in this disclosure.

In one embodiment, the unmanned driving device may first obtain two frames of laser point clouds acquired in a surrounding environment as a first point cloud and a second point cloud respectively. The laser point cloud includes information of each obstacle in the surrounding environment of driving of the unmanned driving device, and a time of acquiring the first point cloud is earlier than that of acquiring the second point cloud.

S102: Determine an obstacle aggregation region in the first point cloud according to position information of each obstacle in the first point cloud.

To avoid a matching error of each obstacle in the two consecutive frames of the laser point clouds in the aggregation region caused by aggregation of the obstacles in the surrounding environment, a matched obstacle group may be further limited, to improve the matching accuracy of the aggregated obstacles. Therefore, in this disclosure, whether there is an obstacle aggregation region in the first point cloud acquired by the unmanned driving device may be first detected. When it is detected that there is the obstacle aggregation region in the first point cloud, the matched obstacle group is further limited.

In one embodiment, the unmanned driving device may determine a distance between every two obstacles in the first point cloud according to the position information of each obstacle in the first point cloud; and then determine the obstacle aggregation region in the first point cloud according to the distance between every two obstacles in the first point cloud.

Further, when the obstacle aggregation region is determined according to the distance between every two obstacles, if a quantity of obstacles with distances less than a distance threshold exceeds a first predetermined threshold, it may be determined that a region in which the obstacles with distances less than the distance threshold are located is the obstacle aggregation region. The first predetermined threshold may be set as required. This is not limited in this disclosure.

In another embodiment, obstacle densities in at least some regions in the first point cloud may alternatively be determined according to the position information of each obstacle in the first point cloud. In addition, a region with an obstacle density greater than a second predetermined threshold is determined as the obstacle aggregation region from several regions in which obstacle densities are determined. The second predetermined threshold may be set as required. This is not limited in this disclosure. In addition, the first point cloud may include one obstacle aggregation region, or may include a plurality of obstacle aggregation regions.

Further, when the obstacle densities in the at least some regions in the first point cloud are determined, region division may be performed on the first point cloud according to a predetermined division range, to determine each subregion included in the first point cloud. Then, for each subregion in the first point cloud, a quantity of obstacles falling into the subregion is determined according to the position information of each obstacle detected in the first point cloud. In addition, an obstacle density in the subregion is determined according to the quantity of obstacles in the subregion and a region range of the subregion.

Certainly, in other embodiments of this disclosure, the obstacle aggregation region in the first point cloud may alternatively be determined in another manner, for example, by using a clustering algorithm for clustering. A specific adopted manner is not limited in this disclosure, and may be set as required, provided that the region in which the obstacles are densely distributed in the first point cloud is determined.

S104: Determine, according to a position of the obstacle aggregation region, at least one obstacle in the second point cloud that falls within the obstacle aggregation region as at least one aggregated obstacle, and at least one another obstacle in the second point cloud except the at least one aggregated obstacle as at least one non-aggregated obstacle.

Because a time interval at which the unmanned driving device continuously acquires each laser point cloud during driving is relatively short, it may be considered that within the time interval for continuously acquiring two frames of laser point clouds, a position of each dynamic obstacle in the surrounding environment does not change significantly. Therefore, in this disclosure, according to the obstacle aggregation region in the first point cloud, an aggregated obstacle in an aggregation region and a non-aggregated obstacle in a non-aggregation region in the second point cloud may be determined.

In one embodiment, for each obstacle in the second point cloud, the unmanned driving device may determine whether the obstacle is located within the obstacle aggregation region of the first point cloud. When it is determined that the obstacle is located within the obstacle aggregation region, the obstacle is determined as an aggregated obstacle. When it is determined that the obstacle is not located within the obstacle aggregation region, the obstacle is determined as a non-aggregated obstacle.

Figure 2:
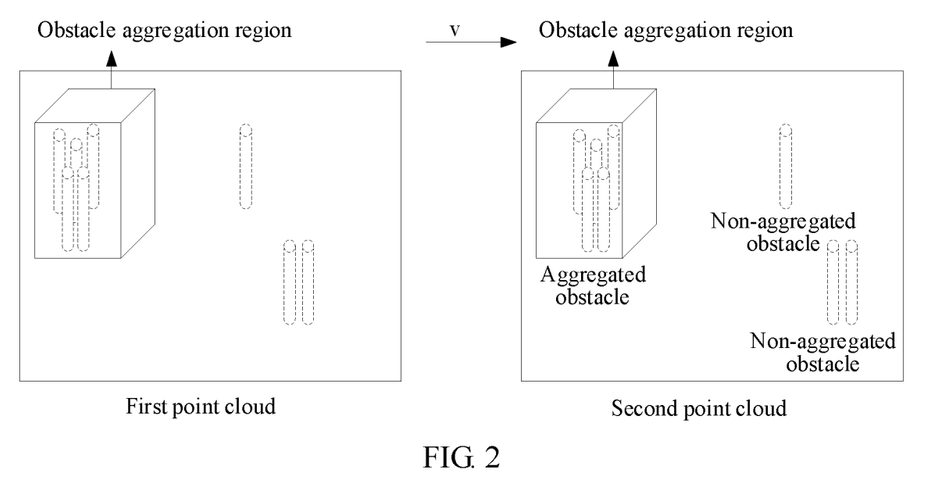
FIG. 2 is a schematic diagram of determining an obstacle aggregation region according to an embodiment of this disclosure.

As shown in FIG. 2, a left side of FIG. 2 shows a first point cloud acquired by the unmanned driving device, and a right side shows a second point cloud acquired by the unmanned driving device, where cylinders connected by dotted lines represent obstacles, and each obstacle travels to the right. According to a position of each obstacle in the first point cloud, an obstacle aggregation region with densely distributed obstacles in the first point cloud may be determined, as shown in a three-dimensional (3D) box in FIG. 2. Then, according to the determined obstacle aggregation region, an obstacle falling in the obstacle aggregation region (the 3D box in FIG. 2) in the second point cloud is determined as an aggregated obstacle, and an obstacle not falling in the second point cloud in the obstacle aggregation region is a non-aggregated obstacle.

S106: For each of the at least one aggregated obstacle, respectively determine matching parameter values between the aggregated obstacle and each obstacle in the first point cloud by using a group matching rule, and determine a matching result of the aggregated obstacle according to the matching parameter values between the aggregated obstacle and each obstacle in the first point cloud.

In one or more embodiments in accordance with this disclosure, an obstacle group in the aggregation region is relatively densely distributed. Therefore, when an obstacle matching is performed, a matching rule with a relatively strong constraint may be used, to improve the matching accuracy of the aggregated obstacle.

In one embodiment, for each aggregated obstacle in the second point cloud, according to obstacle information of the aggregated obstacle and obstacle information of each obstacle in the first point cloud, matching parameter values between the aggregated obstacle and each obstacle in the first point cloud may be respectively determined by using a group matching rule. The obstacle information includes at least a position, a size, a quantity of included points, a type, and the like of the obstacle. A larger matching parameter value between two obstacles indicates a lower matching degree (that is, a similarity) between the two obstacles. The group matching rule includes matching rules corresponding to different feature dimensions, such as a distance dimension, a size dimension, a point quantity dimension, and a type dimension.

When a matching degree between the obstacles in the distance dimension is determined based on the group matching rule, a distance between the aggregated obstacle and each obstacle in the first point cloud may be determined according to the position of the aggregated obstacle and the position of each obstacle in the first point cloud. Then, for each obstacle in the first point cloud, a matching parameter value between the aggregated obstacle and the obstacle in the distance dimension is determined according to a distance between the aggregated obstacle and the obstacle. The position of the obstacle is a position of a centre point of the obstacle. A smaller distance between the aggregated obstacle and the obstacle indicates a smaller matching parameter value, and it indicates a higher similarity between the aggregated obstacle and the obstacle in the distance dimension. That is, the matching parameter value is negatively correlated with the similarity between the two obstacles.

Further, when the matching parameter value between the two obstacles in the distance dimension is determined according to the distance between the two obstacles, to distinguish matching degrees between the obstacles based on distance differences between the obstacles, the matching parameter value between the two obstacles may be determined by using the following formula:

$$f(t) = \begin{cases} x_1 \Delta t, & \Delta t > t_0 \\ x_2 \Delta t, & \Delta t \geq t_0 \end{cases}$$

where $\Delta t$ represents the distance between the two obstacles, $t_0$ represents a second predetermined threshold, and may be specifically set as required, $x_1$ represents a first weight, $x_2$ represents a second weight, and f(t) represents the matching parameter value between the two obstacles in the distance dimension. When the distance between the two obstacles is greater than the second predetermined threshold, it indicates a lower matching degree between the two obstacles, and it may be determined that the matching parameter value between the two obstacles in the distance dimension is $x_2 \Delta t$. When the distance between the two obstacles is less than the second predetermined threshold, it indicates a higher matching degree between the two obstacles, and it may be determined that the matching parameter value between the two obstacles in the distance dimension is $x_1 \Delta t$. Moreover, because the matching parameter value is negatively correlated with the similarity between the two obstacles, the second weight $x_2$ is often set to be greater than the first weight $x_1$.

When a matching degree between the obstacles in the size dimension is determined based on the group matching rule, for each obstacle in the first point cloud, a matching parameter value between the aggregated obstacle and the obstacle in the size dimension may be determined according to a size of the aggregated obstacle and a size of the obstacle.

Further, when the matching parameter value between the two obstacles in the size dimension is determined according to a size between the two obstacles, the matching parameter value of the aggregated obstacle in the second point cloud and the obstacle in the first point cloud in the size dimension may be determined according to a size ratio, such as a length ratio or width ratio, between the two obstacles and a third weight corresponding to the size dimension.

Furthermore, to improve the matching accuracy when the obstacle is a pedestrian to avoid collision with the pedestrian, therefore, in this disclosure, when it is determined that any one of the two obstacles is a pedestrian, and a size of the other obstacle is greater than a predetermined size of the pedestrian, the third weight may be increased, to further obtain a larger matching parameter value, which represents a lower similarity between the two obstacles.

When a matching degree between the obstacles in the point quantity dimension is determined based on the group matching rule, for each obstacle in the first point cloud, a matching parameter value between the aggregated obstacle and the obstacle in the point quantity dimension may be determined according to a quantity of points included in the aggregated obstacle in the second point cloud and a quantity of points included in the obstacle in the first point cloud.

Further, when the matching parameter value between the two obstacles in the point quantity dimension is determined according to the quantity of points included in the two obstacles, the matching parameter value between the two obstacles in the point quantity dimension may be determined by using the following formula:

$$g(O) = \begin{cases} x_4 \left( \dfrac{O_2 - O_1}{O_2} \right), & O_1 < O_2 \\ x_4 \left( \dfrac{O_1 - O_2}{O_1} \right), & O_1 \geq O_2 \end{cases}$$

where $O_1$ represents the quantity of points included in the obstacle in the first point cloud, $O_2$ represents the quantity of points included in the aggregated obstacle in the second point cloud, $x_4$ represents a fourth weight corresponding to the point quantity dimension, and g(O) represents the matching parameter value between the two obstacles in the point quantity dimension.

When a matching degree between the obstacles in the type dimension is determined based on the group matching rule, for each obstacle in the first point cloud, a matching parameter value between the aggregated obstacle and the obstacle in the type quantity dimension may be determined according to a type of the aggregated obstacle in the second point cloud and a type of the obstacle in the first point cloud. For example, when it is determined that the types of the two obstacles are the same, it may be determined that a matching parameter value between the two obstacles in the type dimension is 0, and when it is determined that the types of the two obstacles are different, it may be determined that the matching parameter value between the two obstacles in the type dimension is 1.

Then, for each obstacle in the first point cloud, a matching parameter value between the aggregated obstacle and the obstacle in the first point cloud may be determined according to a matching parameter value between the aggregated obstacle and the obstacle in the first point cloud in at least one of the feature dimensions.

Finally, after the matching parameter values between each aggregated obstacle in the second point cloud and each obstacle in the first point cloud are determined, a matching result of each aggregated obstacle may be determined according to each matching parameter value by using a matching algorithm. The matching algorithm may be a Kuhn-Munkres (KM) algorithm, a Gale-Shapley algorithm, or the like. This is not limited in this disclosure, and may be specifically set as required.

S108: For each of the at least one non-aggregated obstacle, respectively determine matching parameter values between the non-aggregated obstacle and each obstacle in the first point cloud by using a non-group matching rule, and determine a matching result of the non-aggregated obstacle according to the matching parameter values between the non-aggregated obstacle and each obstacle in the first point cloud.

In one or more embodiments of this disclosure, because the obstacles in the non-aggregation region are relatively dispersedly distributed, when an obstacle matching is performed, a matching rule with a relatively weak constraint may be used for obstacle matching. That is, the constraint of the group matching rule for matching on the aggregated obstacle is stronger than that of the non-group matching rule for matching on the non-aggregated obstacle.

In one embodiment, for each non-aggregated obstacle in the second point cloud, according to obstacle information of the non-aggregated obstacle and obstacle information of each obstacle in the first point cloud, matching parameter values between the non-aggregated obstacle and each obstacle in the first point cloud may be respectively determined by using a non-group matching rule. The obstacle information includes at least a position, an orientation, a size, a quantity of included points, a type, and the like of the obstacle. A larger matching parameter value between two obstacles indicates a lower matching degree between the two obstacles. The non-group matching rule includes matching rules corresponding to different feature dimensions, such as a distance dimension, a size dimension, a point quantity dimension, a type dimension, and an orientation dimension.

Further, when each non-aggregated obstacle and each obstacle in the first point cloud are matched based on a matching rule of each different feature dimension in the non-group matching rule, reference may also be made to the method in the foregoing step S106, to respectively determine matching parameter values between the non-aggregated obstacle and each obstacle in the first point cloud in the distance dimension, the size dimension, the point quantity dimension, or the type dimension.

The aggregated obstacle group is more stable in the environment, that is, position changes of the aggregated obstacles are relatively small. However, the non-aggregated obstacles are less stable in the environment, and position changes are relatively large. Therefore, when the aggregated obstacles are matched, a stronger constraint may be set on the distance dimension. That is, the first weight set for the distance dimension in the group matching rule is greater than a first weight set for the distance dimension in the non-group matching rule. The second weight set for the distance dimension in the group matching rule is also greater than a second weight set for the distance dimension in the non-group matching rule.

The aggregated obstacles are relatively densely distributed, and situations such as under-segmentation may occur. For example, two obstacles are connected to form one obstacle, resulting in a large size of the obstacle and a relatively large quantity of point clouds. However, the non-aggregated obstacles are relatively sparsely distributed, a single obstacle is relatively prone to be obtained through segmentation. Therefore, when the aggregated obstacles are matched, a weaker constraint may be set in the size dimension and the point quantity dimension. That is, a third weight set for the size dimension in the group matching rule is less than a third weight set for the distance dimension in the non-group matching rule. A fourth weight set for the point quantity dimension in the group matching rule is also less than a fourth weight set for the point quantity dimension in the non-group matching rule.

Furthermore, because the non-aggregated groups are relatively sparsely distributed, current orientations of the obstacles can be better distinguished. Therefore, in this disclosure, when the non-aggregated obstacles are matched, for each to-be-matched obstacle in the first point cloud, a matching parameter value between the non-aggregated obstacle and the obstacle in the orientation dimension may be determined according to an orientation of the non-aggregated obstacle and an orientation of the obstacle.

Then, for each obstacle in the first point cloud, a matching parameter value between the non-aggregated obstacle and the obstacle in the first point cloud is determined according to a matching parameter value between the non-aggregated obstacle and the obstacle in the first point cloud in at least one of the feature dimensions.

Finally, after the matching parameter values between each non-aggregated obstacle in the second point cloud and each obstacle in the first point cloud are determined, a matching result of each non-aggregated obstacle may be determined according to each matching parameter value by using the matching algorithm. The matching algorithm may be a Kuhn-Munkres (KM) algorithm, a Gale-Shapley algorithm, or the like. This is not limited in this disclosure, and may be specifically set as required.

S110: Determine an obstacle tracking result according to the matching result of each of the at least one aggregated obstacle and the matching result of each of the at least one non-aggregated obstacle.

In one or more embodiments of this disclosure, when a matching result of each aggregated obstacle and a matching result of each non-aggregated obstacle in the second point cloud are determined, each obstacle that is successfully tracked may be determined.

In one embodiment, for each pair of obstacles that are successfully matched, it may be determined that the obstacles are successfully tracked and are the same obstacle, and a speed of the obstacle may be updated according to position information of the same obstacle in the first point cloud and the second point cloud respectively and a time interval of acquiring the two frames of laser point clouds. A following driving path of the unmanned driving device is planned according to updated information such as a speed of each obstacle.

Based on the obstacle tracking method shown in FIG. 1, an obstacle aggregation region in the first point cloud may be determined according to position information of each obstacle in the first point cloud acquired by the unmanned driving device. Then, an aggregated obstacle and a non-aggregated obstacle in the second point cloud acquired by the unmanned driving device are determined according to the obstacle aggregation region. In addition, a matching result of each aggregated obstacle is respectively determined based on a group matching rule, and a matching result of each non-aggregated obstacle is respectively determined based on a non-group matching rule. Finally, an obstacle tracking result is determined according to the matching result of each obstacle in the second point cloud. Based on different matching rules, the aggregated obstacle and the non-aggregated obstacle are respectively matched, which improves the matching accuracy of the aggregated obstacle, so that the obstacle tracking result is more accurate.

In this embodiment of this disclosure, the matching parameter value is negatively correlated with a similarity between the obstacle in the second point cloud and the obstacle in the first point cloud in a predetermined dimension. If the predetermined dimension includes a plurality of dimensions, the matching parameter value may be obtained based on a plurality of matching parameter values corresponding to the plurality of dimensions. For a matching parameter value corresponding to a specific dimension, a dimension value between the two obstacles in the dimension may be determined according to obstacle information of the obstacle in the second point cloud and the obstacle in the first point cloud, and the matching parameter value is then determined according to the dimension value.

In one embodiment, when the predetermined dimension is the distance dimension, a distance between the obstacle in the second point cloud and the obstacle in the first point cloud is a dimension value in the distance dimension, and the matching parameter value determined based on this is negatively correlated with the similarity between the two obstacles in the distance dimension. A larger matching parameter value indicates a lower similarity between the two obstacles in the distance dimension. Similarly, dimension values between the obstacle in the second point cloud and the obstacle in the first point cloud in the size dimension, the orientation dimension, the point quantity dimension, and the type dimension may be further determined respectively, and for each dimension, a matching parameter value determined based on the dimension value in the dimension is negatively correlated with the similarity between the two obstacles in the dimension.

Further, based on the matching parameter values between the obstacle in the second point cloud and the obstacle in the first point cloud in different dimensions, when a final matching parameter value between the two obstacles is determined, under a condition that dimension values between the obstacle in the second point cloud and the obstacle in the first point cloud in the dimensions are the same, if the obstacle in the second point cloud is the aggregated obstacle, the final matching parameter value determined according to the dimension values between the two obstacles in the dimensions by using the group matching rule is relatively large, that is, it indicates that the similarity between the obstacle in the second point cloud and the obstacle in the first point cloud is relatively low. If the obstacle in the second point cloud is the non-aggregated obstacle, the final matching parameter value determined according to the dimension values between the two obstacles in the dimensions by using the non-group matching rule is relatively small, that is, it indicates that the similarity between the obstacle in the second point cloud and the obstacle in the first point cloud is relatively high. That is, the constraint of the group matching rule is stronger than the constraint of the non-group matching rule. In this embodiment of this disclosure, the matching parameter value is negatively correlated with the similarity.

In this disclosure, when the obstacles included in the first point cloud and the second point cloud are determined, this frame of laser point cloud may be inputted into a pre-trained point cloud classification model, to determine each obstacle in the frame of laser point cloud. In another embodiment, clustering may be performed according to a type of each point in the frame of laser point cloud by using a clustering algorithm, and each obstacle in the frame of laser point cloud is determined according to a clustering result. The clustering algorithm may include, but is not limited to a density-based spatial clustering of applications with noise (DBSCAN) algorithm.

Certainly, each obstacle included in the laser point cloud may alternatively be detected in another manner. Because the detection of the obstacle from the laser point cloud is a relatively mature technology, there is no improvement in this disclosure. Therefore, a training process and a clustering process of the point cloud classification model are not described in detail again, and a specific adopted manner may be set as required.

In step S102, when it is detected that the first point cloud does not include the obstacle aggregation region, it may be determined that there is no obstacle aggregation in a surrounding environment at a current time. Therefore, it may be determined that each obstacle included in the second point cloud is the non-aggregated obstacle, and an obstacle tracking result is determined by using the subsequent step S108 to step S110.

In step S106, if the aggregated obstacle matches each obstacle in the first point cloud, and no matched obstacle is obtained, the aggregated obstacle may be changed to the non-aggregated obstacle, and matching is performed again by using the non-group matching rule.

In step S106 and step S108, to further improve the matching accuracy of each obstacle, when the matching parameter value between the two obstacles is greater than the predetermined value, it may be determined that the two obstacles are extremely dissimilar, and the similarity is relatively low. Therefore, it may be determined that the two obstacles do not match. Then, a matching result of each obstacle may be subsequently determined according to each obstacle whose matching parameter value is less than the predetermined value by using a matching algorithm.

In one or more embodiments of this disclosure, a sequence in which the foregoing step S106 and step S108 are performed is not limited. The aggregated obstacle may be first matched, or the non-aggregated obstacle may be first matched, or the two obstacles are matched simultaneously. This is not limited in this disclosure, and may be set as required.

In another embodiment of this disclosure, to reduce a calculation amount of matching the obstacle, each aggregated obstacle may alternatively be first matched. Next, when the non-aggregated obstacle is matched, obstacles that do not match any aggregated obstacle in the second point cloud may be determined as a first obstacle set from each obstacle included in the first point cloud. Then, for each non-aggregated obstacle, matching parameter values between the non-aggregated obstacle and each obstacle in the first obstacle set are respectively determined by using a non-group matching rule. Finally, a matching result of each non-aggregated obstacle is determined according to the matching parameter values between each non-aggregated obstacle and each obstacle in the first obstacle set.

Certainly, in this disclosure, if a position of the matched obstacle does not change, it may be determined that the obstacle is a static obstacle, and a moving speed is 0. If the speed of the obstacle has been determined according to a laser point cloud acquired during historical driving, an acceleration of the obstacle may be determined according to a speed determined in history, positions of the obstacle in the first point cloud and the second point cloud, and a time interval of acquiring the two frames of laser point cloud.

In addition, for an obstacle that fails to match in the second point cloud, that is, no matched obstacle in the first point cloud corresponding to the obstacle, it may be considered that the obstacle is a newly added obstacle, and the newly added obstacle may be subsequently tracked.

In this disclosure, the foregoing group matching rule set for the aggregated obstacle and the non-group matching rule set for the non-aggregated obstacle are merely an exemplary implementation. Certainly, in other implementations of this disclosure, another matching rule may alternatively be set for the aggregated obstacle and the non-aggregated obstacle. A specific setting manner of another matching rule is not limited in this disclosure, and may be set as required, provided that the aggregated obstacle may be tracked more accurately.

The foregoing description is the method in which the unmanned driving device acquires laser point clouds in a surrounding environment, and performs obstacle tracking based on the laser point clouds. In addition, in this disclosure, the unmanned driving device may alternatively track each obstacle in the surrounding environment in a manner of acquiring environment images. If the unmanned driving device performs obstacle tracking in the manner of acquiring the environment images, two frames of environment images continuously acquired by the unmanned driving device may be obtained, and obstacle tracking is performed in the manner described in the foregoing step S102 to step S110. Because the foregoing steps have been described in detail, details are not described again in this disclosure. Certainly, the unmanned driving device may alternatively comprehensively perform obstacle tracking with reference to the acquired environment images and laser point clouds. This is not limited in this disclosure, and may be specifically set as required.

The obstacle tracking method shown in this disclosure may be used in an unmanned delivery process. When the obstacle tracking method is used to perform an unmanned delivery task, the unmanned driving device may track each surrounding obstacle by using the obstacle tracking method in this disclosure, and plan a delivery path according to obstacle information of each obstacle tracked in real time, to perform the delivery task according to the planned path.

Figure 3:
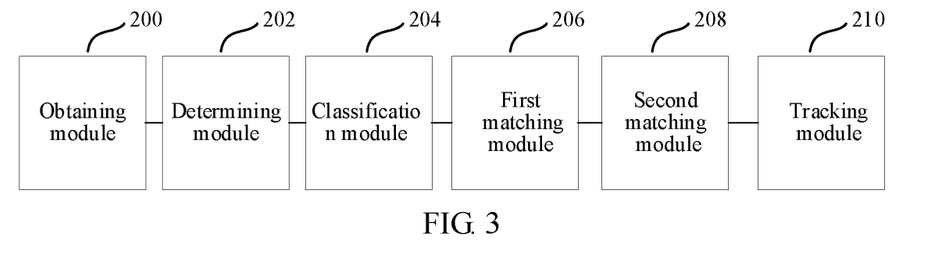
FIG. 3 is a schematic structural diagram of an obstacle tracking apparatus according to an embodiment of this disclosure.

Based on the obstacle tracking method shown in FIG. 1, an embodiment in accordance with this disclosure further correspondingly provides a schematic structural diagram of an obstacle tracking apparatus shown in FIG. 3.

FIG. 3 is a schematic structural diagram of an obstacle tracking apparatus according to an embodiment of this disclosure. The apparatus includes:

an obtaining module 200, configured to obtain two frames of laser point clouds acquired by an unmanned driving device as a first point cloud and a second point cloud respectively;

a determining module 202, configured to determine an obstacle aggregation region in the first point cloud according to position information of each obstacle in the first point cloud;

a classification module 204, configured to determine, according to a position of the obstacle aggregation region, at least one obstacle in the second point cloud that falls within the obstacle aggregation region as at least one aggregated obstacle, and at least one another obstacle in the second point cloud except the at least one aggregated obstacle as at least one non-aggregated obstacle;

a first matching module 206, configured to, for each of the at least one aggregated obstacle, respectively determine a matching parameter value between the aggregated obstacle and each obstacle in the first point cloud by using a group matching rule, and determine a matching result of the aggregated obstacle according to the matching parameter value between the aggregated obstacle and each obstacle in the first point cloud;

a second matching module 208, configured to, for each non-aggregated obstacle in the at least one non-aggregated obstacle, respectively determine a matching parameter value between the non-aggregated obstacle and each obstacle in the first point cloud by using a non-group matching rule, and determine a matching result of the non-aggregated obstacle according to the matching parameter value between the non-aggregated obstacle and each obstacle in the first point cloud, where a constraint condition of the group matching rule is stronger than a constraint condition of the non-group matching rule; and a tracking module 210, configured to determine an obstacle tracking result according to a matching result of each of the at least one aggregated obstacle and a matching result of each non-aggregated obstacle in the at least one non-aggregated obstacle.

Further, the determining module 202 is specifically configured to: determine a distance between every two obstacles in the first point cloud according to the position information of each obstacle in the first point cloud; and determine the obstacle aggregation region in the first point cloud according to the distance between every two obstacles in the first point cloud.

Further, the first matching module 206 is specifically configured to perform at least one of the following: respectively determine the matching parameter value between the aggregated obstacle and each obstacle in the first point cloud according to a distance between the aggregated obstacle and each obstacle in the first point cloud; respectively determine the matching parameter value between the aggregated obstacle and each obstacle in the first point cloud according to a size of the aggregated obstacle and a size of each obstacle in the first point cloud; respectively determine the matching parameter value between the aggregated obstacle and each obstacle in the first point cloud according to a quantity of points included in the aggregated obstacle in the second point cloud and a quantity of points included in each obstacle in the first point cloud; or respectively determine the matching parameter value between the aggregated obstacle and each obstacle in the first point cloud according to a type of the aggregated obstacle and a type of each obstacle in the first point cloud.

Further, the second matching module 208 is specifically configured to perform at least one of the following: respectively determine the matching parameter value between the non-aggregated obstacle and each obstacle in the first point cloud according to a distance between the non-aggregated obstacle and each obstacle in the first point cloud; respectively determine the matching parameter value between the non-aggregated obstacle and each obstacle in the first point cloud according to a size of the non-aggregated obstacle and a size of each obstacle in the first point cloud; respectively determine the matching parameter value between the non-aggregated obstacle and each obstacle in the first point cloud according to a quantity of points included in the non-aggregated obstacle in the second point cloud and a quantity of points included in each obstacle in the first point cloud; respectively determine the matching parameter value between the non-aggregated obstacle and each obstacle in the first point cloud according to a type of the non-aggregated obstacle and a type of each obstacle in the first point cloud; or respectively determine the matching parameter value between the non-aggregated obstacle and each obstacle in the first point cloud according to an orientation of the non-aggregated obstacle and an orientation of each obstacle in the first point cloud.

Further, the aggregated obstacle is changed to a non-aggregated obstacle in a case that the matching result of the aggregated obstacle is not determined.

Further, the second matching module 208 is specifically configured to: determine, from each obstacle included in the first point cloud, obstacles that do not match any aggregated obstacle in the second point cloud as a first obstacle set; and for each non-aggregated obstacle, respectively determine a matching parameter value between the non-aggregated obstacle and each obstacle in the first obstacle set by using a non-group matching rule, and determine a matching result of the non-aggregated obstacle according to the matching parameter value between the non-aggregated obstacle and each obstacle in the first obstacle set.

Further, the determining module 202 is further configured to determine that each obstacle included in the second point cloud is a non-aggregated obstacle, when the first point cloud does not include the obstacle aggregation region.

An embodiment in accordance with this disclosure further provides a computer-readable storage medium, storing a computer program. The computer program may be used for performing the foregoing obstacle tracking method provided in FIG. 1.

Figure 4:
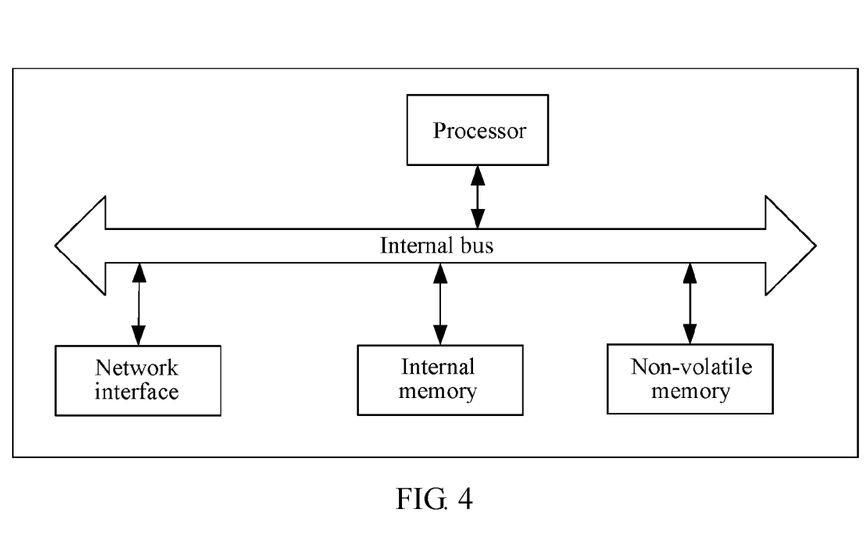
FIG. 4 is a schematic diagram of an unmanned driving device implementing an obstacle tracking method according to an embodiment of this disclosure.

Based on the obstacle tracking method shown in FIG. 1, an embodiment in accordance with this disclosure further provides a schematic structural diagram of an unmanned driving device shown in FIG. 4. As shown in FIG. 4, at a hardware level, the unmanned driving device includes a processor, an internal bus, a network interface, an internal memory, and a non-volatile memory, and may certainly further include hardware required for other services. The processor reads a corresponding computer program from the non-volatile storage into the memory and then runs the computer program, to implement the foregoing obstacle tracking method shown in FIG. 1.

Definitely, in addition to a software implementation, this disclosure does not exclude other implementations, for example, a logic device or a combination of software and hardware. In other words, an entity executing the following processing procedure is not limited to the logic units, and may also be hardware or logic devices.

In the 1990s, improvements of a technology can be clearly distinguished as hardware improvements (for example, improvements to a circuit structure such as a diode, a transistor, or a switch) or software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and generate a dedicated integrated circuit chip. Moreover, nowadays, instead of manually generating integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced Boolean expression language (ABEL), altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that provided that a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20, and Silicone Labs C8051F320. The memory controller can also be implemented as part of the memory control logic. A person skilled in the art will also appreciate that, in addition to implementing the controller in the form of pure computer-readable program code, it is also possible to implement, by logically programming the method steps, the controller in the form of a logic gate, switch, ASIC, programmable logic controller, and embedded microcontroller and other forms to achieve the same function. Such a controller can thus be considered as a hardware component and apparatuses included therein for implementing various functions can also be considered as structures inside the hardware component. In another embodiment, apparatuses configured to implement various functions can be considered as both software modules implementing the method and structures inside the hardware component.

The system, the apparatus, the module or the unit described in the foregoing embodiments may be implemented by a computer chip or an entity, or implemented by a product having a certain function. A typical implementation device is a computer. In one embodiment, the computer may be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are respectively described. Certainly, during implementation of this disclosure, the functions of the units may be implemented in the same piece of or a plurality of pieces of software and/or hardware.

A person skilled in the art should understand that, the embodiments of the present invention may be provided as a method, a system, or a computer program product. Therefore, the present invention may be in a form of complete hardware embodiments, complete software embodiments, or combination of software and hardware. Moreover, the present invention may use a form of a computer program product that is implemented on one or more computer-usable storage media (including but not limited to a disk memory, a compact disc read-only memory (CD-ROM), an optical memory, and the like) that include computer-usable program code.

The present invention is described with reference to the flowcharts and/or block diagrams of the method, the device (system), and the computer program product according to the embodiments of the present invention. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), an input/output interface, a network interface, and an internal memory.

The memory may include a form such as a volatile memory, a random-access memory (RAM) and/or a non-volatile memory such as a read-only memory (ROM) or a flash RAM in a computer-readable medium. The memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. An example of a computer storage medium includes, but not limited to, a phase-change memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical memory, a cassette, a magnetic tape, a magnetic disk memory or another magnetic storage device, or any other non-transmission medium, and may be used to store information accessible by the computing device. Based on the definition in the present disclosure, the computer-readable medium does not include transitory computer readable media (transitory media), such as a modulated data signal and a carrier.

It should be further noted that, the terms "include", "comprise", or any variants thereof are intended to cover a non-exclusive inclusion. Therefore, a process, method, article, or device that includes a series of elements not only includes such elements, but also includes other elements not specified expressly, or may include inherent elements of the process, method, article, or device. Unless otherwise specified, an element limited by "include a/an . . . " does not exclude other same elements existing in the process, the method, the article, or the device that includes the element.

A person skilled in the art should understand that, the embodiments in accordance with this disclosure may be provided as a method, a system, or a computer program product. Therefore, this disclosure may use a form of hardware only embodiments, software only embodiments, or embodiments with a combination of software and hardware. Moreover, this disclosure may use a form of a computer program product that is implemented on one or more computer-usable storage media (including but not limited to a disk memory, a compact disc read-only memory (CD-ROM), an optical memory, and the like) that include computer-usable program code.

This disclosure can be described in the general context of computer-executable instructions executed by a computer, for example, program modules. Generally, the program module includes a routine, a program, an object, a component, a data structure, and the like for executing a particular task or implementing a particular abstract data type. This disclosure may also be implemented in a distributed computing environment in which tasks are performed by remote processing devices connected by using a communication network. In a distributed computing environment, the program module may be located in both local and remote computer storage media including storage devices.

The embodiments in accordance with this disclosure are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The descriptions are merely embodiments of this disclosure, and are not intended to limit this disclosure. For a person skilled in the art, various modifications and changes may be made to this disclosure. Any modifications, equivalent replacements, and improvements made within the spirit and principle of this disclosure shall fall within the scope of the claims of this disclosure.

What is claimed is:

1. An obstacle tracking method, comprising:
obtaining two frames of laser point clouds acquired by an unmanned driving device as a first point cloud and a second point cloud;
determining an obstacle aggregation region in the first point cloud according to position information of each obstacle in the first point cloud;
determining, according to a position of the obstacle aggregation region, at least one obstacle in the second point cloud within the obstacle aggregation region as at least one aggregated obstacle, and at least one another obstacle, except the at least one aggregated obstacle, in the second point cloud as at least one non-aggregated obstacle; and for each of the at least one aggregated obstacle,
  determining matching parameter values between the aggregated obstacle and each obstacle in the first point cloud by using a group matching rule, and
  determining a matching result of the aggregated obstacle according to the matching parameter values between the aggregated obstacle and each obstacle in the first point cloud;
for each of the at least one non-aggregated obstacle,
  determining matching parameter values between the non-aggregated obstacle and each obstacle in the first point cloud by using a non-group matching rule, and
  determining a matching result of the non-aggregated obstacle according to the matching parameter values between the non-aggregated obstacle and each obstacle in the first point cloud, wherein a constraint condition of the group matching rule is stronger than a constraint condition of the non-group matching rule; and
determining an obstacle tracking result according to the matching result of each of the at least one aggregated obstacle and the matching result of each of the at least one non-aggregated obstacle.

2. The method according to claim 1, wherein determining the obstacle aggregation region in the first point cloud according to the position information of each obstacle in the first point cloud comprises:
  determining a distance between every two obstacles in the first point cloud according to the position information of each obstacle in the first point cloud; and
  determining the obstacle aggregation region in the first point cloud according to the distance between every two obstacles in the first point cloud.

3. The method according to claim 1, wherein determining the matching parameter values between the aggregated obstacle and each obstacle in the first point cloud by using the group matching rule comprises at least one of:
  for each obstacle in the first point cloud, determining a matching parameter value between the aggregated obstacle and the obstacle in the first point cloud according to a distance between the aggregated obstacle and the obstacle in the first point cloud;
  for each obstacle in the first point cloud, determining a matching parameter value between the aggregated obstacle and the obstacle in the first point cloud according to a size of the aggregated obstacle and a size of the obstacle in the first point cloud;
  for each obstacle in the first point cloud, determining a matching parameter value between the aggregated obstacle and the obstacle in the first point cloud according to a quantity of points comprised in the aggregated obstacle in the second point cloud and a quantity of points comprised in the obstacle in the first point cloud; or
  for each obstacle in the first point cloud, determining a matching parameter value between the aggregated obstacle and the obstacle in the first point cloud according to a type of the aggregated obstacle and a type of the obstacle in the first point cloud.

4. The method according to claim 1, wherein determining the matching parameter values between the non-aggregated obstacle and each obstacle in the first point cloud by using the non-group matching rule comprises at least one of:
  for each obstacle in the first point cloud, determining a matching parameter value between the non-aggregated obstacle and the obstacle in the first point cloud according to a distance between the non-aggregated obstacle and the obstacle in the first point cloud;
  for each obstacle in the first point cloud, determining a matching parameter value between the non-aggregated obstacle and the obstacle in the first point cloud according to a size of the non-aggregated obstacle and a size of the obstacle in the first point cloud;
  for each obstacle in the first point cloud, determining a matching parameter value between the non-aggregated obstacle and the obstacle in the first point cloud according to a quantity of points comprised in the non-aggregated obstacle in the second point cloud and a quantity of points comprised in the obstacle in the first point cloud;
  for each obstacle in the first point cloud, determining a matching parameter value between the non-aggregated obstacle and the obstacle in the first point cloud according to a type of the non-aggregated obstacle and a type of the obstacle in the first point cloud; or
  for each obstacle in the first point cloud, determining a matching parameter value between the non-aggregated obstacle and the obstacle in the first point cloud according to an orientation of the non-aggregated obstacle and an orientation of the obstacle in the first point cloud.

5. The method according to claim 1, further comprising:
  changing the aggregated obstacle to a non-aggregated obstacle in response to the matching result of the aggregated obstacle being not determined.

6. The method according to claim 1, wherein determining the matching parameter values between the non-aggregated obstacle and each obstacle in the first point cloud by using the non-group matching rule comprises:
  determining obstacles in the first point cloud that do not match any aggregated obstacle in the second point cloud as a first obstacle set; and
  determining matching parameter values between the non-aggregated obstacle and each of the obstacles in the first obstacle set by using the non-group matching rule; and, wherein
  determining the matching result of the non-aggregated obstacle according to the matching parameter values between the non-aggregated obstacle and each obstacle in the first point cloud comprises:
    determining a matching result of the non-aggregated obstacle according to the matching parameter values between the non-aggregated obstacle and each of the obstacles in the first obstacle set.

7. The method according to claim 1, further comprising:
  determining that each obstacle comprised in the second point cloud is a non-aggregated obstacle, when the first point cloud does not comprise the obstacle aggregation region.

8. A non-transitory computer-readable storage medium, having stored thereon a computer program such that when the computer program is executed by a processor, the computer program causes the processor to perform:
  obtaining two frames of laser point clouds acquired by an unmanned driving device as a first point cloud and a second point cloud;
  determining an obstacle aggregation region in the first point cloud according to position information of each obstacle in the first point cloud;
  determining, according to a position of the obstacle aggregation region, at least one obstacle in the second point cloud that falls within the obstacle aggregation region as at least one aggregated obstacle, and at least one another obstacle, except the at least one aggregated obstacle, in the second point cloud as at least one non-aggregated obstacle; and for each of the at least one aggregated obstacle,
determining matching parameter values between the aggregated obstacle and each obstacle in the first point cloud by using a group matching rule, and
determining a matching result of the aggregated obstacle according to the matching parameter values between the aggregated obstacle and each obstacle in the first point cloud;

for each of the at least one non-aggregated obstacle,
determining matching parameter values between the non-aggregated obstacle and each obstacle in the first point cloud by using a non-group matching rule, and
determining a matching result of the non-aggregated obstacle according to the matching parameter values between the non-aggregated obstacle and each obstacle in the first point cloud, wherein a constraint condition of the group matching rule is stronger than a constraint condition of the non-group matching rule; and determining an obstacle tracking result according to the matching result of each of the at least one aggregated obstacle and the matching result of each of the at least one non-aggregated obstacle.

9. The non-transitory computer-readable storage medium according to claim 8, wherein determining the obstacle aggregation region in the first point cloud according to the position information of each obstacle in the first point cloud comprises:
determining a distance between every two obstacles in the first point cloud according to the position information of each obstacle in the first point cloud; and
determining the obstacle aggregation region in the first point cloud according to the distance between every two obstacles in the first point cloud.

10. The non-transitory computer-readable storage medium according to claim 8, wherein determining the matching parameter values between the aggregated obstacle and each obstacle in the first point cloud by using the group matching rule comprises at least one of:
for each obstacle in the first point cloud, determining a matching parameter value between the aggregated obstacle and the obstacle in the first point cloud according to a distance between the aggregated obstacle and the obstacle in the first point cloud;
for each obstacle in the first point cloud, determining a matching parameter value between the aggregated obstacle and the obstacle in the first point cloud according to a size of the aggregated obstacle and a size of the obstacle in the first point cloud;
for each obstacle in the first point cloud, determining a matching parameter value between the aggregated obstacle and the obstacle in the first point cloud according to a quantity of points comprised in the aggregated obstacle in the second point cloud and a quantity of points comprised in the obstacle in the first point cloud; or
for each obstacle in the first point cloud, determining a matching parameter value between the aggregated obstacle and the obstacle in the first point cloud according to a type of the aggregated obstacle and a type of the obstacle in the first point cloud.

11. The non-transitory computer-readable storage medium according to claim 8, wherein determining the matching parameter values between the non-aggregated obstacle and each obstacle in the first point cloud by using the non-group matching rule comprises at least one of:
for each obstacle in the first point cloud, determining a matching parameter value between the non-aggregated obstacle and the obstacle in the first point cloud according to a distance between the non-aggregated obstacle and the obstacle in the first point cloud;
for each obstacle in the first point cloud, determining a matching parameter value between the non-aggregated obstacle and the obstacle in the first point cloud according to a size of the non-aggregated obstacle and a size of the obstacle in the first point cloud;
for each obstacle in the first point cloud, determining a matching parameter value between the non-aggregated obstacle and the obstacle in the first point cloud according to a quantity of points comprised in the non-aggregated obstacle in the second point cloud and a quantity of points comprised in the obstacle in the first point cloud;
for each obstacle in the first point cloud, determining a matching parameter value between the non-aggregated obstacle and the obstacle in the first point cloud according to a type of the non-aggregated obstacle and a type of the obstacle in the first point cloud; or
for each obstacle in the first point cloud, determining a matching parameter value between the non-aggregated obstacle and the obstacle in the first point cloud according to an orientation of the non-aggregated obstacle and an orientation of the obstacle in the first point cloud.

12. The non-transitory computer-readable storage medium according to claim 8, the operations further comprise:
changing the aggregated obstacle to a non-aggregated obstacle in response to the matching result of the aggregated obstacle being not determined.

13. The non-transitory computer-readable storage medium according to claim 8, wherein determining the matching parameter values between the non-aggregated obstacle and each obstacle in the first point cloud by using the non-group matching rule comprises:
determining obstacles in the first point cloud that do not match any aggregated obstacle in the second point cloud as a first obstacle set; and
determining matching parameter values between the non-aggregated obstacle and each of the obstacles in the first obstacle set by using the non-group matching rule; and
determining the matching result of the non-aggregated obstacle according to the matching parameter values between the non-aggregated obstacle and each obstacle in the first point cloud comprises:
determining a matching result of the non-aggregated obstacle according to the matching parameter values between the non-aggregated obstacle and each of the obstacles in the first obstacle set.

14. An unmanned driving device, comprising a memory, a processor, and a computer program stored on the memory and executable on the processor, the processor is configured to, when executing the program, implement operations comprising:
obtaining two frames of laser point clouds acquired by an unmanned driving device as a first point cloud and a second point cloud;
determining an obstacle aggregation region in the first point cloud according to position information of each obstacle in the first point cloud;

determining, according to a position of the obstacle aggregation region, at least one obstacle in the second point cloud that falls within the obstacle aggregation region as at least one aggregated obstacle, and at least one another obstacle, except the at least one aggregated obstacle, in the second point cloud as at least one non-aggregated obstacle; and for each of the at least one aggregated obstacle,
determining matching parameter values between the aggregated obstacle and each obstacle in the first point cloud by using a group matching rule, and
determining a matching result of the aggregated obstacle according to the matching parameter values between the aggregated obstacle and each obstacle in the first point cloud;

for each of the at least one non-aggregated obstacle,
determining matching parameter values between the non-aggregated obstacle and each obstacle in the first point cloud by using a non-group matching rule, and
determining a matching result of the non-aggregated obstacle according to the matching parameter values between the non-aggregated obstacle and each obstacle in the first point cloud, wherein a constraint condition of the group matching rule is stronger than a constraint condition of the non-group matching rule; and determining an obstacle tracking result according to the matching result of each of the at least one aggregated obstacle and the matching result of each of the at least one non-aggregated obstacle.

15. The unmanned driving device according to claim 14, wherein determining the obstacle aggregation region in the first point cloud according to the position information of each obstacle in the first point cloud comprises:
determining a distance between every two obstacles in the first point cloud according to the position information of each obstacle in the first point cloud; and
determining the obstacle aggregation region in the first point cloud according to the distance between every two obstacles in the first point cloud.

16. The unmanned driving device according to claim 14, wherein determining the matching parameter values between the aggregated obstacle and each obstacle in the first point cloud by using the group matching rule comprises at least one of:
for each obstacle in the first point cloud, determining a matching parameter value between the aggregated obstacle and the obstacle in the first point cloud according to a distance between the aggregated obstacle and the obstacle in the first point cloud;
for each obstacle in the first point cloud, determining a matching parameter value between the aggregated obstacle and the obstacle in the first point cloud according to a size of the aggregated obstacle and a size of the obstacle in the first point cloud;
for each obstacle in the first point cloud, determining a matching parameter value between the aggregated obstacle and the obstacle in the first point cloud according to a quantity of points comprised in the aggregated obstacle in the second point cloud and a quantity of points comprised in the obstacle in the first point cloud; or
for each obstacle in the first point cloud, determining a matching parameter value between the aggregated obstacle and the obstacle in the first point cloud according to a type of the aggregated obstacle and a type of the obstacle in the first point cloud.

17. The unmanned driving device according to claim 14, wherein determining the matching parameter values between the non-aggregated obstacle and each obstacle in the first point cloud by using the non-group matching rule comprises at least one of:
for each obstacle in the first point cloud, determining a matching parameter value between the non-aggregated obstacle and the obstacle in the first point cloud according to a distance between the non-aggregated obstacle and the obstacle in the first point cloud;
for each obstacle in the first point cloud, determining a matching parameter value between the non-aggregated obstacle and the obstacle in the first point cloud according to a size of the non-aggregated obstacle and a size of the obstacle in the first point cloud;
for each obstacle in the first point cloud, determining a matching parameter value between the non-aggregated obstacle and the obstacle in the first point cloud according to a quantity of points comprised in the non-aggregated obstacle in the second point cloud and a quantity of points comprised in the obstacle in the first point cloud;
for each obstacle in the first point cloud, determining a matching parameter value between the non-aggregated obstacle and the obstacle in the first point cloud according to a type of the non-aggregated obstacle and a type of the obstacle in the first point cloud; or
for each obstacle in the first point cloud, determining a matching parameter value between the non-aggregated obstacle and the obstacle in the first point cloud according to an orientation of the non-aggregated obstacle and an orientation of the obstacle in the first point cloud.

18. The unmanned driving device according to claim 14, the operations further comprise:
changing the aggregated obstacle to a non-aggregated obstacle in response to the matching result of the aggregated obstacle being not determined.

19. The unmanned driving device according to claim 14, wherein determining the matching parameter values between the non-aggregated obstacle and each obstacle in the first point cloud by using the non-group matching rule comprises:
determining obstacles in the first point cloud that do not match any aggregated obstacle in the second point cloud as a first obstacle set; and
determining matching parameter values between the non-aggregated obstacle and each of the obstacles in the first obstacle set by using the non-group matching rule; and
determining the matching result of the non-aggregated obstacle according to the matching parameter values between the non-aggregated obstacle and each obstacle in the first point cloud comprises:
determining a matching result of the non-aggregated obstacle according to the matching parameter values between the non-aggregated obstacle and each of the obstacles in the first obstacle set.

20. The unmanned driving device according to claim 14, the operations further comprise:
determining that each obstacle comprised in the second point cloud is a non-aggregated obstacle, when the first point cloud does not comprise the obstacle aggregation region.

* * * * *